(12) United States Patent
Bielek et al.

(10) Patent No.: US 7,498,968 B1
(45) Date of Patent: Mar. 3, 2009

(54) SYNTHETIC APERTURE DESIGN FOR INCREASED SAR IMAGE RATE

(75) Inventors: Timothy P. Bielek, Albuquerque, NM (US); Douglas G. Thompson, Albuqerque, NM (US); Bruce C. Walker, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 57 days.

(21) Appl. No.: 11/674,264

(22) Filed: Feb. 13, 2007

Related U.S. Application Data

(60) Provisional application No. 60/802,387, filed on May 22, 2006.

(51) Int. Cl.
  *G01S 13/00* (2006.01)
  *G01S 13/52* (2006.01)

(52) U.S. Cl. ............... 342/25 R; 342/25 B; 342/25 F; 342/90; 342/160

(58) Field of Classification Search ............ 342/25 R, 342/25 B, 25 F, 90, 160, 195, 196
See application file for complete search history.

(56) References Cited

U.S. PATENT DOCUMENTS

| | | | | |
|---|---|---|---|---|
| 5,122,803 A * | 6/1992 | Stann et al. | ............... | 342/25 B |
| 5,343,204 A * | 8/1994 | Farmer et al. | ............. | 342/25 F |
| 5,563,601 A * | 10/1996 | Cataldo | ............. | 342/25 A |
| 5,608,404 A * | 3/1997 | Burns et al. | ............. | 342/25 A |
| 5,708,436 A * | 1/1998 | Loiz et al. | ............. | 342/25 A |
| 5,969,662 A * | 10/1999 | Hellsten | ............. | 342/25 A |
| 6,400,306 B1 * | 6/2002 | Nohara et al. | ............. | 342/25 R |
| 6,426,718 B1 * | 7/2002 | Ridgway | ............. | 342/160 |
| 6,518,914 B1 * | 2/2003 | Peterson et al. | ........... | 342/25 R |
| 6,697,010 B1 * | 2/2004 | Lam | ............. | 342/25 R |
| 6,756,934 B1 * | 6/2004 | Chen et al. | ............. | 342/89 |
| 6,781,541 B1 * | 8/2004 | Cho | ............. | 342/25 D |
| 6,943,724 B1 * | 9/2005 | Brace et al. | ............. | 342/25 B |
| 6,952,178 B2 * | 10/2005 | Kirscht | ............. | 342/25 B |
| 7,154,434 B1 * | 12/2006 | Sego | ............. | 342/161 |
| 7,259,715 B1 * | 8/2007 | Garren et al. | ............. | 342/179 |

OTHER PUBLICATIONS

B.L. Burns and J.T. Cordaro, "A SAR Image-Formation Algorithm that Compensates for the Spatially-Variant Effects of Antenna Motion," in <i>SPIE,</i> vol. 2230, Orlando, FL, Apr. 1994, pp. 14-24.*

R. Fiedler, R. Jansen, "Joint time-frequency analysis of SAR data", Proceedings of the 10th IEEE Workshop on Statistical and Array Processing, pp. 480-484, Pocono Manor, PA, USA, Aug. 14-Aug. 16, 2000.

R. Fiedler, R. Jansen, "Adventures in SAR processing", Proceedings of the SPIE—The International Society for Optical Engineering, Wavelet Applications VII, vol. 4056, pp. 186-196, Orlando, FL, USA, Apr. 26-Apr. 28, 2000.

(Continued)

*Primary Examiner*—Thomas H Tarcza
*Assistant Examiner*—Peter M Bythrow
(74) *Attorney, Agent, or Firm*—Scott B. Stahl

(57) ABSTRACT

High resolution SAR images of a target scene at near video rates can be produced by using overlapped, but nevertheless, full-size synthetic apertures. The SAR images, which respectively correspond to the apertures, can be analyzed in sequence to permit detection of movement in the target scene.

30 Claims, 2 Drawing Sheets

FIG. 1

OTHER PUBLICATIONS

T. Ainsworth, R. Jansen, J. S. Lee, R. Fiedler, "Sub-aperture analysis of high-resolution polarimetric SAR data", Proceedings of the IEEE 1999 International Geoscience and Remote Sensing Symposium, IGARSS '99, vol. 1, pp. 41-43, Hamburg, Germany, Jun, 28- Jul. 2, 1999.

B. Burns, J. Cordaro, "SAR image formation algorithm that compensates for the spatially variant effects of antenna motion", SPIE Proceedings, vol. 2230, SPIE's International Symposium on Optical Engineering in Aerospace Sensing, 12 pages, Orlando, FL, USA, Apr. 4-8, 1994.

* cited by examiner

SYNTHETIC APERTURE DESIGN FOR INCREASED SAR IMAGE RATE

This application claims the priority under 35 U.S.C. §119 (e)(1) of co-pending provisional application Ser. No. 60/802,387, filed May 22, 2006 and incorporated herein by reference.

This invention was developed under Contract DE-AC04-94AL85000 between Sandia Corporation and the U.S. Department of Energy. The U.S. Government has certain rights in this invention.

FIELD OF THE INVENTION

The invention relates generally to synthetic aperture radar (SAR) and, more particularly, to SAR techniques that support detection of target scene dynamics.

BACKGROUND OF THE INVENTION

Conventional spotlight-mode Synthetic Aperture Radar (SAR) collects a set of data that represents the response (radar echo) produced by a target scene when illuminated by a sequence of radar pulses contained in a synthetic aperture. The collected data is processed into a SAR image. Customarily, a single coherent data set (single synthetic aperture) is used to form a single image. A sequence of SAR images is normally produced from a sequence of respectively corresponding synthetic apertures. Because each SAR image in the SAR image sequence is associated with a respectively corresponding synthetic aperture, the image rate of the sequence is limited by the time that is required to fly the length of the synthetic aperture. The flying time, and thus the image rate, is a function of range, and can be tens of seconds at long ranges. Such limitations on the image rate can impede the SAR system's ability to support detection of dynamic changes that are occurring in the target scene.

A faster image rate (also referred to herein as frame rate) would require either a higher platform velocity, or a shorter synthetic aperture. The velocity is limited by the aircraft or spacecraft capabilities. A shorter synthetic aperture typically requires either a range that is unacceptably short, or an image resolution that is unacceptably coarse.

It is desirable in view of the foregoing to provide for SAR image rates that permit detection of target scene dynamics.

DETAILED DESCRIPTION

Figure 1:
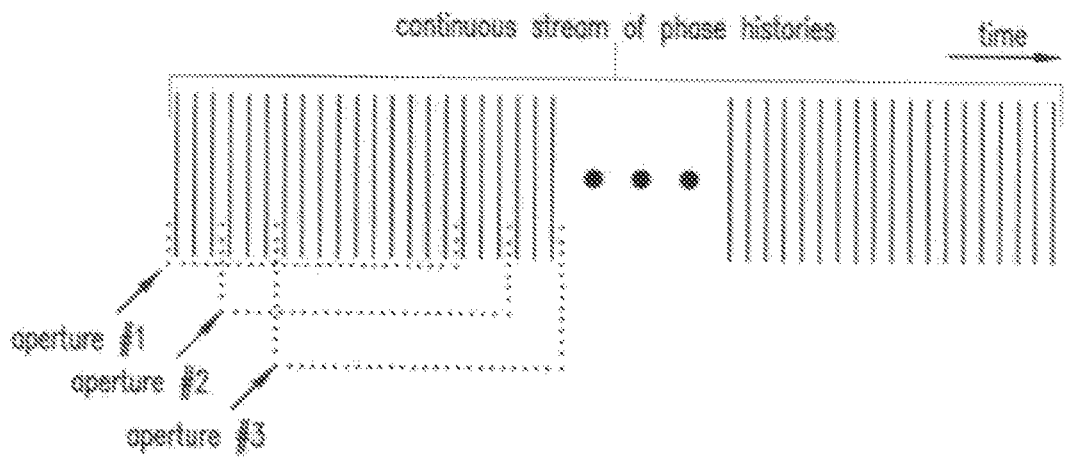
FIG. 1 graphically illustrates a stream of SAR phase histories according to exemplary embodiments of the present invention.

Synthetic aperture radars measure range and Doppler. The time delay from the radar to the target and back to the radar is indicative of the range. Doppler is the change in radar signal phase due to a change in range as a function of time. Stationary objects have the same Doppler frequency as the ground on which they are located because the range from the radar to the object is changing in a similar manner as the range from the radar to the ground beneath the object. Moving objects can have a different Doppler frequency than the surrounding terrain. Moving objects whose velocity contributes to the change in range from the object to the radar will have a different Doppler frequency than the surrounding terrain. This causes the Doppler position of moving objects in a SAR image to be incorrect. For example, moving trains will often be displaced from the tracks in a SAR image. This type of phenomena can limit the usefulness of SAR in scenes with dynamic content.

Just as in optical images, objects in a SAR image cast shadows where an object blocks the radar transmission from reaching the ground (or whatever may be located in the shadow) and echoing back therefrom to the radar. A portion of a target scene located in the radar shadow of an object receives no incident energy from the radar, so no return is received from the shadowed portion. The position of the radar shadow is determined by the object's position relative to the radar system. In a monostatic radar system, where the transmitter and receiver are collocated, the shadow will appear in the line-of-sight direction from the radar to the object, on the opposite side of the object from the radar system. As the radar system and the object move, the position of the shadow also moves. The Doppler frequency of a radar shadow of a moving object is the same as the surrounding terrain, so its position in the SAR image reflects the true position of the moving object relative to the terrain. Thus, movement of the object relative to the terrain can be observed by following the position of the object's radar shadow. However, the use of radar shadows to track movement is limited by the aforementioned relatively slow image update rate associated with conventional SAR systems. The position of the shadow can change greatly from one image to the next, so that the human eye or a machine may not be able to integrate the changes easily.

Exemplary embodiments of the invention provide for the formation of high-resolution SAR images at near video rates, e.g., many times a second. The rate of image update allows users to determine when moving targets start moving, when and where they stop, the direction of motion, and how fast they are moving. Further, the radar shadows of moving targets can be used to determine the position and identity of the targets (including even slow moving targets) with greater accuracy. In addition, MASINT (Measurement And Signatures Intelligence) signatures from ship motion and wave dynamics may also be exploited.

Some embodiments use overlapped, but nevertheless full-size synthetic apertures, and form images respectively from the apertures. The overlapping apertures enable the increased frame rate, and each aperture provides the basis for an independent, fine-resolution SAR image. The images can be displayed and analyzed in sequence, yielding a 'movie-like' appearance of the scene.

In conventional SAR systems, the digitized radar return (echo response) from the target scene is often referred to as a phase history. According to exemplary embodiments of the invention, phase histories are collected without a defined aperture center. With no specified aperture center, the phase histories can be processed into any arbitrary aperture. Some embodiments use the conventional technique of constant dα (angle increment) sampling, and collect the phase histories on a conventional polar grid.

Exemplary embodiments use a continuous stream of phase histories of the target scene, so that a continuous sequence of high-resolution SAR images can be generated. An example of a continuous stream of phase histories is illustrated in FIG. 1. The illustrated apertures define substreams of phase histories within the continuous stream of phase histories. The sizes and centers of the apertures are not predefined and do not affect the collection of phase histories. These aperture parameters can be applied as desired after the phase histories are collected. In the example of FIG. 1, the aperture centers are evenly temporally spaced within the continuous stream of phase histories, and each aperture contains the same number of phase histories (i.e., has the same aperture width, or substream length). Furthermore, the apertures in the FIG. 1 example are arranged in a relatively highly overlapped fashion. More specifically, each aperture in FIG. 1 shares respective majority portions of its phase histories in common with the temporally adjacent apertures, and any given phase history is contained in several apertures. As mentioned above, each aperture forms the basis for a respectively corresponding high-resolution SAR image, so the greater the aperture overlap, the higher the SAR image rate.

Figure 2:
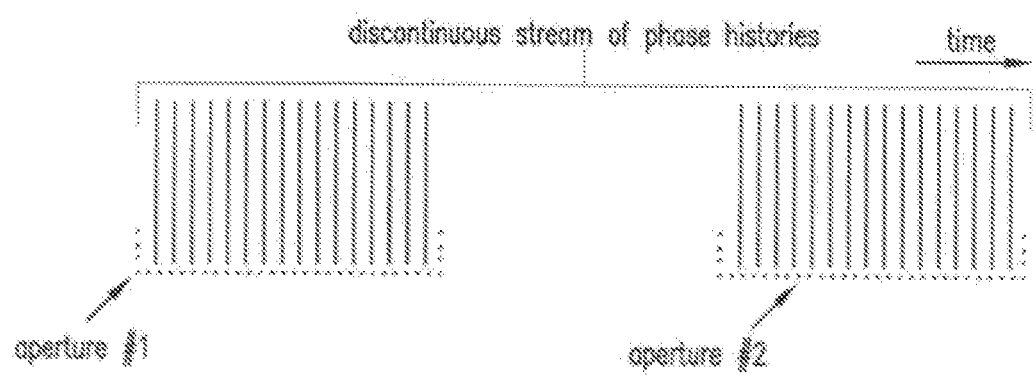
FIG. 2 graphically illustrates a stream of SAR phase histories according to the prior art.

FIG. 2 illustrates a prior art stream of phase histories that exhibits discontinuities between predefined apertures. Note the difference between the discontinuous phase history stream of FIG. 2 and the continuous phase history stream of FIG. 1.

According to exemplary embodiments of the invention, the size of the apertures can be set as desired. In the example of FIG. 1, the aperture size is the same as in the prior art example of FIG. 2.

In order to obtain the continuous phase history stream of FIG. 1, exemplary embodiments of a SAR system according to the invention illuminate the target scene with a continuous stream of SAR pulses. Some embodiments use circular flight paths centered on the target scene, and others use linear flight paths. The time interval between the centers of apertures shown in FIG. 1 can be milliseconds (for example), even for fine resolution images. This is dramatically less than the time interval between apertures shown in the prior art example of FIG. 2, and permits observation and tracking of moving objects based on their radar shadows.

Conventional synthetic aperture radars work by coherently integrating the radar returns from a scene over an angle defined by the desired azimuth resolution. Finer resolutions require larger observation angles and therefore longer observation times. Pixel intensity in a SAR image is typically related to the strength of the radar return from an object averaged over the aperture time. An object or terrain that reflects no energy back to the radar for the entire aperture time will appear dark in a SAR image. The darkness of the shadow in a SAR image is a function of the percentage of time that the terrain is in the shadow of the object relative to the total aperture time. Long aperture times (fine azimuth resolution) and rapidly moving objects will lead to very faint shadows that are difficult to detect and track. Aperture times can be reduced by faster radar platform velocities and coarser azimuth resolutions. Some embodiments of the present invention compromise between resolution and shadow darkness by using, for example, radar platform velocities around 70 meters/sec, and azimuth resolution of about 3 feet.

The darkness of the shadow in a SAR image is also a function of the sensitivity of the radar in terms of radar cross section. In order for the shadow of an object to be noticeable, the minimum radar cross section observable by the radar must be smaller than the radar cross section of the background clutter on which the object is located. Otherwise, the background clutter will not be observable in the SAR image and it will not be possible to observe the absence of a return from that clutter. Two things that affect radar sensitivity are the range resolution and the average transmitter power that is incident on the ground. Coarser range resolutions give greater radar sensitivity, because more of the clutter is contributing to the radar return for a single pixel. Finer range resolutions give larger shadows in terms of the number of image pixels, which aid in shadow observability. Some embodiments compromise between resolution and radar sensitivity by using a range resolution of about 1 foot.

The following factors can contribute to increasing the average transmitter power that is incident on the ground: higher antenna gains; lower system losses; higher peak transmitter power; higher pulse repetition frequency (PRF); and a longer transmitter pulse width. In conventional SAR systems, only the pulse repetition frequency and the transmitter pulse width are typically variable. Increases in the transmitter pulse width are usually limited by the duty factor of the transmitter. Increases in the PRF are usually limited by the duty factor of the transmitter and the range of the radar. The range limitation on PRF arises from the typical requirement that the return from a transmitted pulse must be received before another pulse is transmitted (only a single radar pulse in the air at a time). Some embodiments use conventional pulse coding techniques to avoid the range limitation. Some embodiments with relatively high PRFs use conventional presumming techniques to reduce the number of phase histories to be processed while still achieving an increase in the average transmitter power incident on the ground.

Exemplary embodiments of the invention provide numerous advantages relative to radar systems (e.g., MTI (Moving Target Indicator) systems) that are conventionally used to track moving objects. Some examples of the advantages are briefly summarized below.

In conventional MTI systems, the resolution of the azimuth position of the object is some fraction of the azimuth antenna beamwidth. In exemplary embodiments of the invention, azimuth resolution is limited only by the SAR image formation technique that is used. For comparison, the azimuth accuracy of a conventional exoclutter MTI system is on the order of 100 meters at a range of 10 nautical miles, while some embodiments of the invention provide an azimuth resolution of 3 feet at the same range.

In order for conventional exoclutter MTI radar systems to detect a moving target, the Doppler frequency associated with the target must be outside the Doppler spectrum of the clutter. Accordingly, a target whose line-of-sight velocity is too slow (e.g., under about 7 miles per hour) cannot be detected. By using an object's shadow (instead of its Doppler frequency) to detect movement of the object, exemplary embodiments of the invention can detect velocities down to zero, and provide a high resolution SAR image of the object when it stops moving.

Conventional MTI systems have problems tracking objects that move in crossing paths or in a move/stop/move sequence. A 4-way stop intersection is an example of a difficult scene for MTI systems. First, as vehicles slow down to approach the intersection, their line-of-sight velocity falls below the minimum and they are lost in the main beam clutter. Second, the tracking algorithms used by MTI systems typically assume that an object will keep moving in the same direction in which it was previously moving. At a 4-way stop intersection, a vehicle can move in three possible directions, which will confuse most tracking algorithms. In addition, if the object happens to turn in a direction that is perpendicular to the radar line-of-sight, then the velocity of the object (even after picking up speed) could be too low for detection of its movement. Exemplary embodiments of the invention can successfully track objects that move in crossing paths or in a move/stop/move sequence, as in the example of a 4-way stop intersection.

Conventional exoclutter MTI systems typically ignore objects that exhibit a radar cross section below a certain threshold. This threshold is intended to eliminate false alarms on things like spurious signals and sidelobes that are not moving objects. By detecting an object based on its radar shadow, and not based on its radar echo return, exemplary embodiments can detect/track "stealthy" objects that MTI systems may miss. In fact, most stealth technologies attempt to reflect incident radar energy such that the object's echo return is reduced. However, this does not diminish the detectability of the shadow of the object.

In conventional MTI systems, movement of a target object is shown on a pre-existing map or image that may be old or may lack key information like roads and buildings. Exemplary embodiments of the invention can display detected motion within a high-resolution SAR image of the overall target scene that has been captured contemporaneously with the motion.

Figure 3:
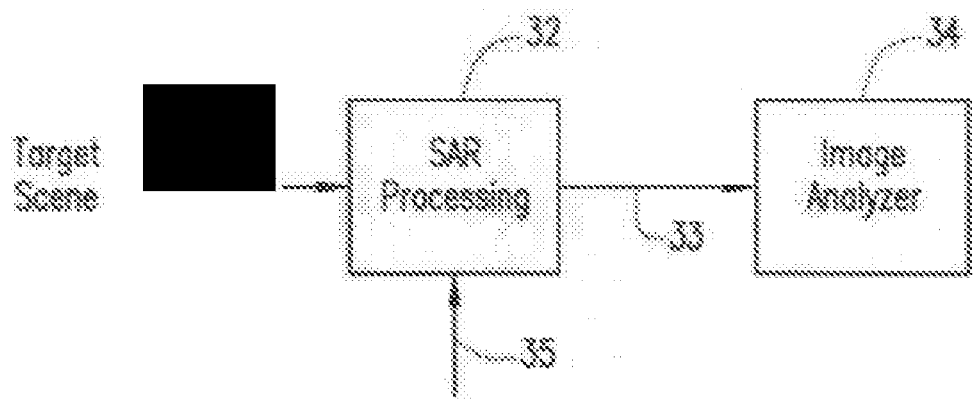
FIG. 3 diagrammatically illustrates a SAR apparatus according to exemplary embodiments of the invention.

FIG. 3 diagrammatically illustrates a SAR apparatus according to exemplary embodiments of the invention. A SAR processing portion 32 receives at 31 a continuous stream of target scene responses to illumination by a continuous stream of SAR pulses. The SAR processing portion 32 produces from the continuous stream of target scene responses a corresponding continuous stream of phase histories such as shown, for example, in FIG. 1. Control information at 35 defines the substreams (apertures) within the continuous stream of phase histories that are to be used to produce SAR images. Referring also now to FIG. 1, in some embodiments, the control information 35 defines the widths of the apertures in FIG. 1 and defines the temporal spacing between the start times of the apertures of FIG. 1. The SAR processing portion 32 uses the substreams (apertures), as designated by the control information 35, to produce SAR images that respectively correspond to the designated substreams. These SAR images are provided at 33 to an image analyzer 34 that facilitates analyzing the SAR images in sequence to detect movement (e.g., shadow movement) in the target scene. In some embodiments, the image analyzer 34 includes a visual display that permits visual detection of the movement. In some embodiments, the image analyzer 34 uses computer-automated image processing techniques to detect the movement automatically.

Figure 4:
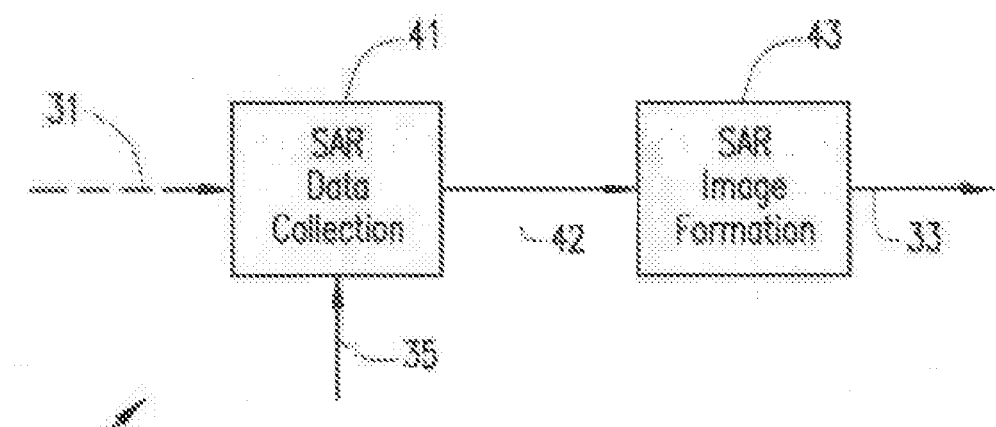
FIG. 4 diagrammatically illustrates a portion of FIG. 3 in more detail according to exemplary embodiments of the invention.

FIG. 4 diagrammatically illustrates the SAR processing portion 32 of FIG. 3 in more detail according to exemplary embodiments of the invention. In FIG. 4, a SAR data collection portion 41 receives the continuous stream of target scene responses at 31, and produces a corresponding continuous stream of phase histories. The SAR data collection portion 41 extracts the phase history substreams designated by the control information 35. These phase history substreams are provided at 42 to a SAR image forming portion 43 that produces therefrom SAR images that respectively correspond to the phase history substreams. These SAR images are then provided at 33 for analysis.

Although exemplary embodiments of the invention have been described above in detail, this does not limit the scope of the invention, which can be practiced in a variety of embodiments.

What is claimed is:

1. A synthetic aperture radar (SAR) method, comprising:
   receiving a continuous stream of target scene responses produced by a target scene when illuminated by a continuous stream of SAR pulses;
   forming a plurality of SAR images that respectively correspond to a plurality of substreams of target scene responses contained within said continuous stream of target scene responses; and
   analyzing said SAR images sequentially to detect movement of a SAR illumination shadow associated with the target scene.

2. The method of claim 1, wherein said analyzing includes displaying said SAR Images sequentially to permit visual detection of said movement.

3. The method of claim 1, wherein each of said substreams consists of a same number of target scene responses.

4. The method of claim 1, wherein temporally adjacent ones of said substreams overlap one another in said stream.

5. The method of claim 4, wherein each of said substreams consists of a same number of target scene responses.

6. The method of claim 5, wherein said substreams have respective temporal centers that are equally temporally spaced within said stream.

7. The method of claim 4, wherein a majority of the target scene responses contained in each of said substreams is also contained in a temporally adjacent one of said substreams.

8. A synthetic aperture radar (SAR) method, comprising:
   receiving a continuous stream of target scene responses produced by a target scene when illuminated by a continuous stream of SAR pulses;
   forming a plurality of SAR images that respectively correspond to a plurality of substreams of target scene responses contained within said continuous stream of target scene responses, wherein temporally adjacent ones of said substreams of target scene responses overlap one another in said continuous stream of target scene responses; and
   analyzing said SAR images sequentially to determine a characteristic of a movement that occurs in the target scene.

9. The method of claim 8, wherein said analyzing includes displaying said SAR images sequentially to permit visual detection of said movement.

10. The method of claim 8, wherein each of said substreams consists of a same number of target scene responses.

11. The method of claim 10, wherein said substreams have respective temporal centers that are equally temporally spaced within said stream.

12. The method of claim 8, wherein a majority of the target scene responses contained in each of said substreams is also contained in a temporally adjacent one of said substreams.

13. A synthetic aperture radar (SAR) apparatus, comprising:
   an input for receiving a continuous stream of target scene responses produced by a target scene when illuminated by a continuous stream of SAR pulses;
   a SAR processing portion coupled to said input and configured to form a plurality of SAR images that respectively correspond to a plurality of substreams of target scene responses contained within said continuous stream of target scene responses; and
   an analysis portion coupled to said SAR processing portion and configured to facilitate analyzing said SAR images sequentially to detect movement of a SAR illumination shadow associated with the target scene.

14. The apparatus of claim 13, wherein said analysis portion is configured to display said SAR images sequentially to permit visual detection of said movement.

15. The apparatus of claim 13, wherein each of said substreams consists of a same number of target scene responses.

16. The apparatus of claim 13, wherein temporally adjacent ones of said substreams overlap one another in said stream.

17. The apparatus of claim 16, wherein each of said substreams consists of a same number of target scene responses.

18. The apparatus of claim 17, wherein said substreams have respective temporal centers that are equally temporally spaced within said stream.

19. The apparatus of claim 16, wherein a majority of the target scene responses contained in each of said substreams is also contained in a temporally adjacent one of said substreams.

20. A synthetic aperture radar (SAR) apparatus, comprising:
- an input for receiving a continuous stream of target scene responses produced by a target scene when illuminated by a continuous stream of SAR pulses,
- a SAR processing portion coupled to said input and configured to form a plurality of SAR images that respectively correspond to a plurality of substreams of target scene responses contained within said continuous stream of target scene responses, wherein temporally adjacent ones of said substreams of target scene responses overlap one another in said continuous stream of target scene responses; and
- an analysis portion coupled to said SAR processing portion and configured to facilitate analyzing said SAR images sequentially to determine a characteristic of a movement that occurs in the target scene.

21. The apparatus of claim 20, wherein said analysis portion is configured to display said SAR images sequentially to permit visual detection of said movement.

22. The apparatus of claim 20, wherein each of said substreams consists of a same number of target scene responses.

23. The apparatus of claim 22, wherein said substreams have respective temporal centers that are equally temporally spaced within said stream.

24. The apparatus of claim 20, wherein a majority of the target scene responses contained in each of said substreams is also contained in a temporally adjacent one of said substreams.

25. The apparatus of claim 20, wherein said characteristic includes one of a start of said movement and an end of said movement.

26. The apparatus of claim 20, wherein said characteristic includes a direction of said movement.

27. The apparatus of claim 20, wherein said characteristic includes a speed of said movement.

28. The method of claim 8, wherein said characteristic includes one of a start of said movement and an end of said movement.

29. The method of claim 8, wherein said characteristic includes a direction of said movement.

30. The method of claim 8, wherein said characteristic includes a speed of said movement.

* * * * *